Sept. 15, 1942.  W. M. DWYER  2,295,778
HATCH COVER FASTENER
Filed Sept. 2, 1938    3 Sheets-Sheet 1
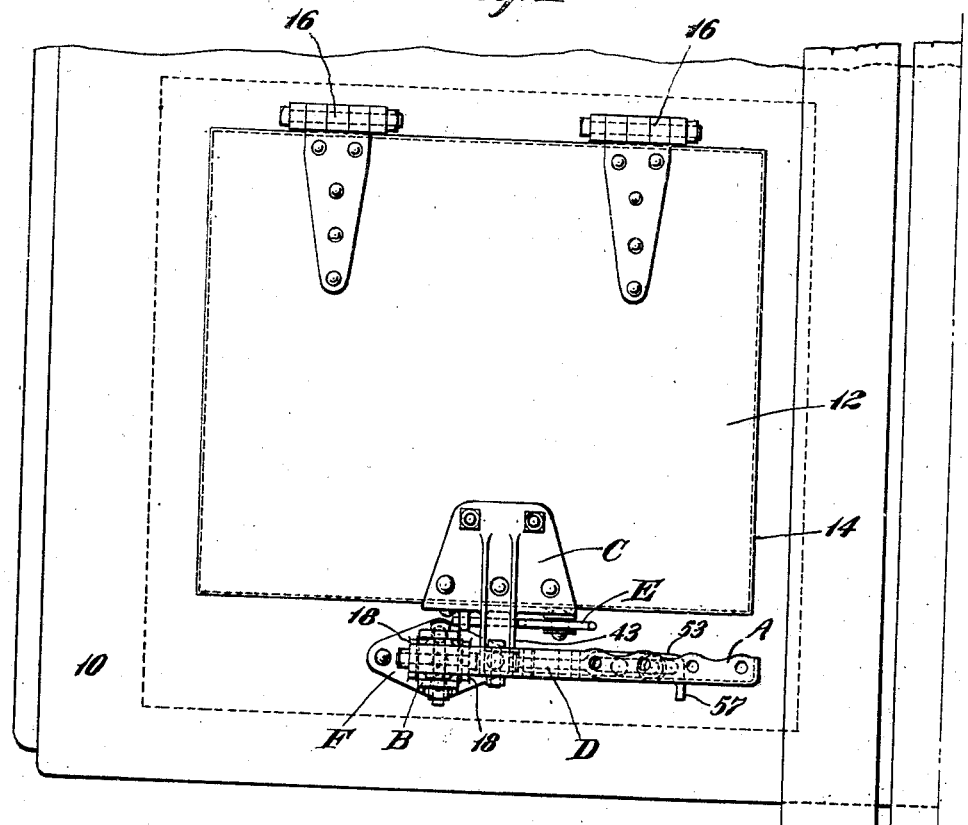
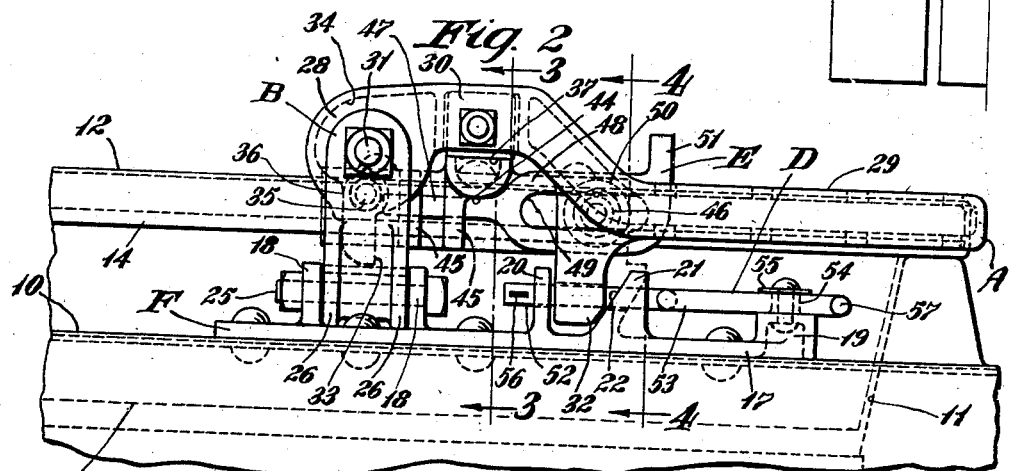
Inventor
William M. Dwyer
By Henry Fuchs.
Atty.

Sept. 15, 1942.        W. M. DWYER        2,295,778
HATCH COVER FASTENER
Filed Sept. 2, 1938        3 Sheets-Sheet 2
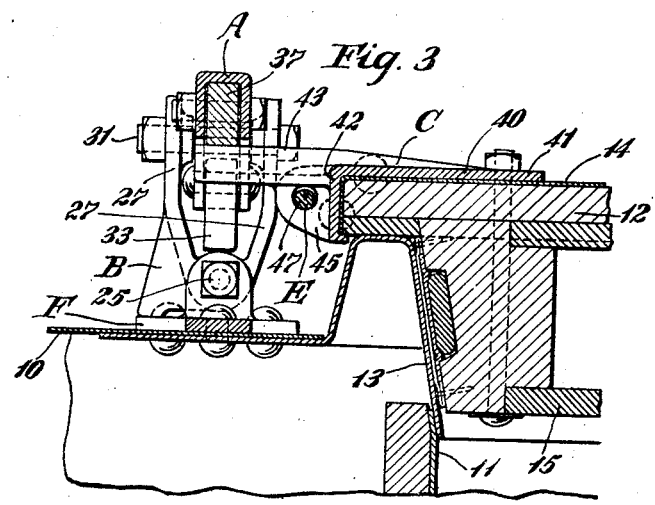
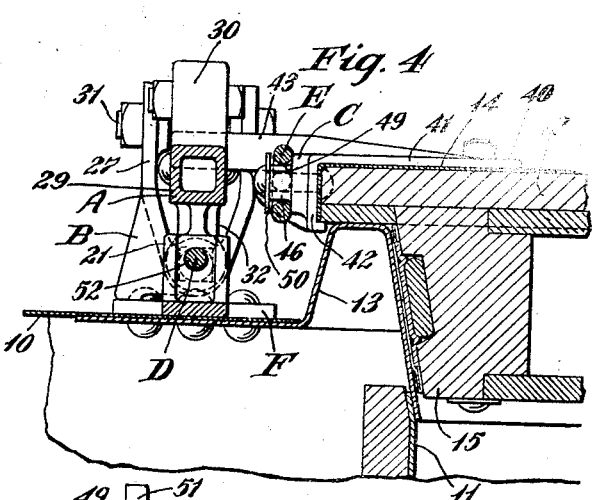
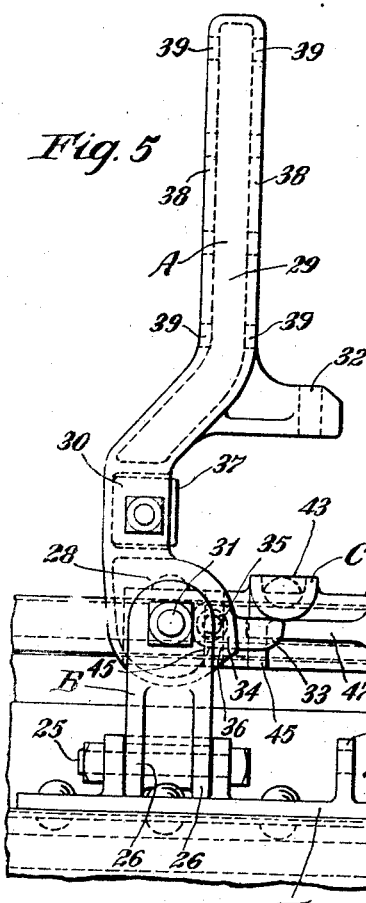
Inventor
William M. Dwyer
By Henry Fuchs.
Atty.

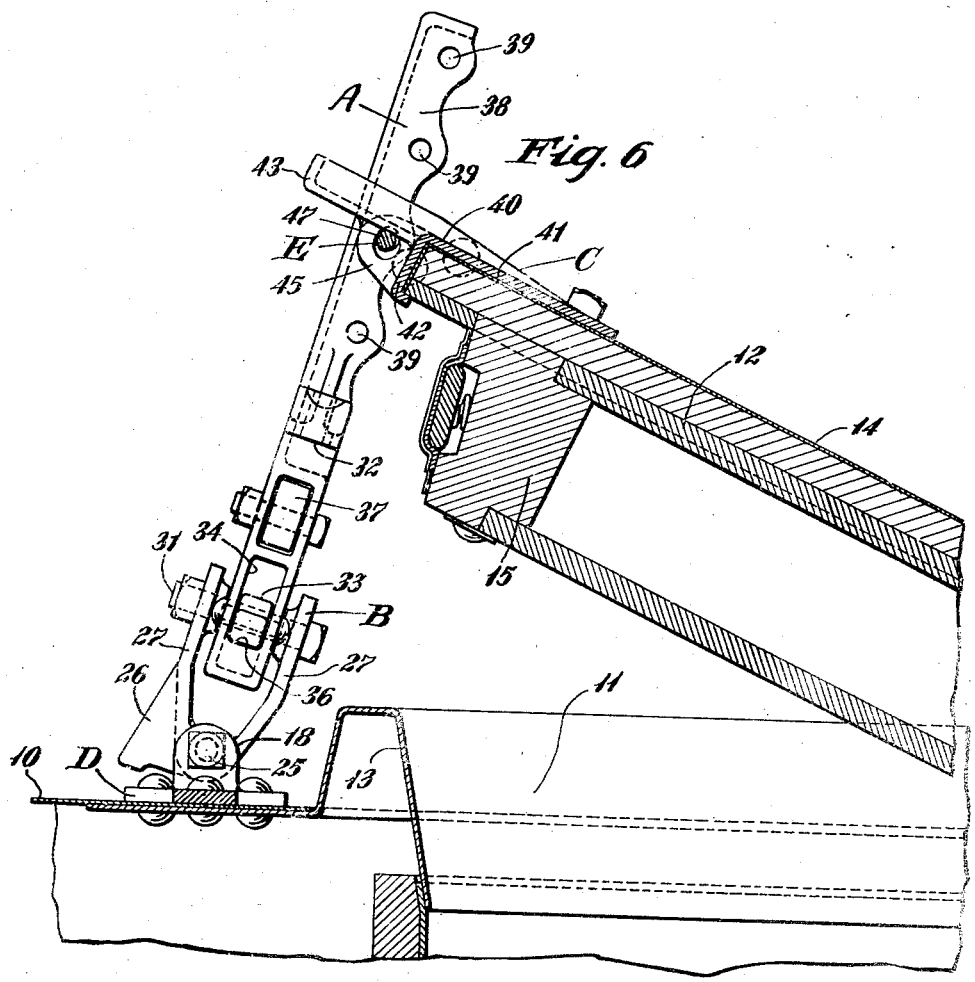

Patented Sept. 15, 1942

2,295,778

UNITED STATES PATENT OFFICE 2,295,778

HATCH COVER FASTENER

William M. Dwyer, Chicago, Ill., assignor to W. H. Miner, Inc., Chicago, Ill., a corporation of Delaware Application September 2, 1938, Serial No. 228,099

8 Claims. (Cl. 98—7)

This invention relates to improvements in hatch cover fasteners for refrigerator cars.

One object of the invention is to provide a fastener for hatch covers comprising an operating lever for forcing the cover open or closed, so arranged and designed that no part of the operating lever projects beyond the end of the car when the cover is locked in closed position.

A more specific object of the invention is to provide a fastener for hinged hatch covers comprising a swinging operating lever having means thereon engaging the cover to force the same open and additional means thereon engaging the cover to force the same closed, wherein the lever is pivoted on an axis at right angles to the axis of swinging movement of the hinged cover, whereby the lever is foldable to a position parallel to the free edge of the cover closely adjacent said edge, when the cover is open or closed, and well within the limits of the end of the car, thus avoiding projecting obstructions at the end of the car which might cause injury to the attendant or any other person employed around the car.

A still further object of the invention is to provide a fastener of the character set forth in the preceding paragraph, wherein the lever is arranged to also serve as means for holding the cover partly open for ventilation and is rockingly supported in such a manner that it may be swung or inclined toward the free edge of the cover, where it may be latched to the cover to support the same.

Other objects of the invention will more clearly appear from the description and claims hereinafter following.

In the drawings forming a part of this specification, Figure 1 is a top plan view of one end portion of a car provided with a hinged hatch cover, illustrating my improvements in connection therewith, said view being broken away. Figure 2 is an end elevational view on an enlarged scale, partly broken away, looking upwardly in Figure 1. Figures 3 and 4 are vertical sectional views, partly broken away, and corresponding respectively to the lines 3—3 and 4—4 of Figure 2. Figure 5 is a view similar to Figure 2, but showing the parts in a different position. Figure 6 is a view similar to Figure 3, but showing the parts in different position, the hatch cover being shown as partly open for ventilating purposes with the operating lever in cover supporting position.

In said drawings, 10 indicates a portion of the roof of a refrigerator car, 11 the usual hatchway, and 12 the hatch cover. As shown, the hatchway 11 is provided with a lining 13 which is continued to extend above the car and is folded outwardly into overlying relation with the portion of the roof immediately adjacent the hatchway. The opening of the hatchway is thus provided with a surrounding wall upstanding above the roof of the car, within which the plug fits. The cover 12 comprises a substantially flat main body portion 14 and a projecting plug 15 on the inner side thereof. The plug portion is adapted to be seated in the hatchway 11 with the body portion 14 of the cover overlapping the walls of the hatchway when the cover is closed. The cover is swingingly supported along one edge by hinges 16—16 of well-known design.

My improved fastener means comprises broadly an operating lever A; a pivoted bracket B on which the lever is pivotally mounted; an abutment member C on the cover cooperating with the lever; a sliding locking member D for holding the cover in closed position; a sliding latch E engageable with the lever A for holding the cover partly open for ventilation; and a support F for the bracket B and locking member D.

The support F includes an elongated flat plate-like base portion 17, which is disposed parallel to the free edge of the hatch cover 12 in spaced relation to said cover, and is secured to the roof of the car by rivets or similar fastening elements. At the left hand end, as seen in Figures 1 and 2, the base portion 17 is provided with two spaced upstanding pivot lugs 18—18 for the bracket B.

At the opposite end, the base plate 17 carries an upstanding boss 19 integral therewith. Intermediate the lugs 18—18 and the boss 19, that is, substantially midway between the ends of the base plate 17, are two spaced upstanding guide lugs 20 and 21, as shown most clearly in Figures 2 and 5. The lug 21 is thicker than the lug 20 and has a face 22 inclined with respect to the lug 20. The lugs 20 and 21 are provided with aligned openings adapted to form guide means, as hereinafter pointed out.

The operating lever A is mounted on the bracket B and the latter is swingingly mounted on the support F by a pivot bolt 25 extending through aligned openings in the lugs 18—18 of said support and an aligned transverse pivot opening in the base portion of the bracket B. The base portion of said bracket B is engaged between the lugs 18—18 and has a laterally outstanding stop flange or web 26 at the left hand side thereof, as viewed in Figures 3 and 4, adapted to engage the upper face of the base plate 17 of the support F to limit swinging movement of the bracket. As shown most clearly in Figures 3 and 4, the upper portion of the bracket B is forked, as indicated at 27, to accommodate the pivoted portion of the lever A, the arms of said forked portion being provided with aligned pivot openings. The pivot formed by the bolt 25 has its axis parallel to the free edge of the hatch cover 12, thus supporting the bracket B and the lever A for swinging movement toward and away from said cover.

The lever A has an enlarged head 28 at its inner end and a handle portion 29 at its outer end. Intermediate the head 28 and the handle portion 29, the body of the lever A is offset, as indicated at 30. The head 28 is embraced between the arms of the fork 27 of the bracket B and is hinged thereto by a pivot bolt 31 extending through the pivot openings of said arms of the fork and an aligned pivot opening in said head. The pivotal axis of the bolt 31 is disposed in a plane at right angles to the pivotal axis of the bolt 25, thus supporting the lever A for swinging movement in a plane at right angles to the plane in which the bracket B swings. The handle section 29 of the lever A is substantially straight, and where it merges with the offset 30 thereof the lever A is provided with a laterally outstanding perforated finger or lug 32 for a purpose hereinafter described. The head 28 of the lever A is provided with a dog 33 adapted to engage the hatch cover, as hereinafter described, to pry the latter upwardly to open the same. The dog 33 is suitably supported in a recessed portion 34 of the head 28 by a pivot pin 35 and has its movement in one direction limited by engagement with a stop shoulder formed by the end wall 36 of said recessed portion of the head. The offset section 30 of the lever A is provided with a socket in which a block 37 is seated. The block 37 is held in said socket by any suitable means, such as a locking bolt, engaged through said block and the side walls of the socket. The block 37, the finger 32, and the pivoted dog 33 are all located on the same side of the lever A and the block 37 projects from said lever and is adapted to cooperate with the hatch cover to force the same tightly closed when the lever A is swung downwardly, as hereinafter pointed out.

The handle portion 29 has spaced, longitudinally extending, webs 38—38 which form side walls of said handle. Each web 38 is provided with a series of spaced openings 39—39, the openings of said webs 38—38 being arranged in transversely aligned sets. Each set of openings 39—39 is adapted to accommodate a latching element, hereinafter described, for latching the hatch cover in ventilating position.

The abutment member C includes a base member 40 secured to the hatch cover 12 at the free edge thereof. This base member comprises a plate portion 41 overlying the upper face of the cover, having a downturned right angular flange portion 42 overhanging the edge face of said cover, said flange portion 42 terminating in a hooked end engaged beneath the underside of the body portion 14 of the cover 12. The member C is fixed to the hatch cover by any well-known securing means, preferably rivets, extending through the plate portion 41 and flange 42. The base member 40 is provided with an outstanding arm or lug 43 projecting beyond the free edge of the hatch cover, as most clearly shown in Figures 1, 3, 4, and 6. The projecting portion of the arm 43 has a substantially flat upper face adapted to be engaged by the block 37 of the lever A in forcing the cover closed, and a rounded lower face 44 adapted to be engaged by the dog 33 of said lever in prying the cover open. The arm 43 is preferably reenforced by longitudinally extending, upstanding side webs, as clearly shown in Figure 1. At the left hand side portion of the member C, as seen in Figures 2 and 5, the flange 42 thereof is provided with a pair of spaced, outstanding, perforated ears 45—45, the outermost of said ears being positioned so that it is accommodated between the webs 38—38 of the handle member 29 of the lever A when the latter is swung into position to support the cover in partly open condition. The space between said ears 45—45 is such as to accommodate the web 38 at the right hand side of the handle 29 of the lever A, as seen in Figure 5, therebetween. At the right hand side portion of the member C, as viewed in Figures 2 and 5, the flange 42 thereof has an outstanding, substantially cylindrical boss 46 forming a guide for the latch E.

The latch E comprises a slide having an elongated pin or bolt portion 47 slidably guided in the perforations of the ears 45—45 of the abutment member C, and a relatively wider platelike section 48, which is longitudinally slotted, as indicated at 49, to accommodate the cylindrical guide boss 46 of the member C. The sliding latch E is retained in operative position on the boss 46 by a washer 50 held seated on the outer end of the boss by a rivet or similar securing element extending through said washer and the boss. The sliding latch E is preferably also provided with an upstanding finger piece 51 by which it may be manipulated.

The locking member D for holding the cover in closed position is in the form of a slide and comprises a cylindrical pin or boltlike portion 52 and an elongated looplike guide portion 53 from which the pinlike portion extends. The looplike portion 53 rests on and is slidably guided on the boss 19 of the support F, said boss being provided with an upstanding reduced portion 54 of cylindrical cross section engaged through the elongated slotlike opening of said looplike portion 53 and guiding said sliding locking member in a substantially straight path. The locking slide D is retained in sliding position by a washer 55 at the upper end of said reduced portion 54 overhanging the side arms of the loop 53 and secured by a rivet extending through said washer and the boss 19. The pinlike portion 52 is slidably guided in the aligned openings of the lugs 20 and 21 of the support F and is of such a length that the outer end portion projects beyond the lug 20 when the locking slide D has been moved to its limit to the left as seen in Figure 2. As shown in the last named figure, the projecting end of the pin or bolt 52 is suitably slotted, as indicated at 56, to receive the usual car seal. As shown in Figures 1, 2, and 7, the slide D is preferably provided with an outstanding finger piece 57 by which it may be manipulated.

In closing and fastening the hatch cover, the operation of my improved mechanism is as follows: Assuming that the hatch cover is in fully open position and the operating lever A is an out of the way position, swung to the left of and beyond the position thereof shown in Figure 5, the cover is first manually swung on its hinges or dropped into overlying relation to the hatch opening, thus bringing the same to loosely closed position. The lever A is then swung from left to right, bringing the block 37 thereof into engagement with the flat upper surface of the lug or arm 43 of the abutment member C of the hatch cover, thus exerting pressure on the cover to force the same tightly closed, as shown in Figures 1 and 2. When the cover has been forced home, as shown in Figure 2, the finger or lug 32 of the lever A engages between the lugs 20 and 21. The lever is then locked in cover holding position by sliding the locking member D from the position shown in Figure 5 to the position shown in Figure 2, thereby engaging the bolt portion 52 thereof through the perforation of the lug 32. The cover 12 is thus maintained in tightly closed position. When the cover has been locked, as described, and as shown in Figures 1 and 2, the sliding locking member D may be sealed in a well-known manner by engaging the usual sealing means through the seal receiving opening 56 of the bolt or pin section 52 of said member D. In this connection, it is pointed out that during closing movement of the handle lever A the pivoted dog 33 is freely swingable to trip over the lug 43 of the abutment member C.

In opening the hatch cover, the operating lever A is first unlocked after removal of the seal from the opening 56 of the locking member D by disengaging the locking member from the lug 32 of said lever through sliding said locking member from the position shown in Figure 2 to that shown in Figure 5. The lever A is then swung upwardly and to the left from the position shown in Figure 2 to and beyond the position shown in Figure 5. During this swinging movement of the lever, the dog 33, which is held against backward swinging movement with respect to the lever by the stop shoulder on said lever formed by the wall 36, engages with the rounded underside of the lug 43 of the abutment member C on the hatch cover and forces the cover upwardly to pry the same partly open, as shown in Figure 5. Swinging movement of the lever A beyond the position shown in Figure 5 clears the dog 33 from contact with the lug 43, whereupon the hatch cover, having been freed from the hatch opening by the prying operation, may be readily manually raised to either partly or fully open position, as desired, by the attendant. In this connection, it will be evident that during both the closing and opening operations the lever A hinges on its pivotal connection with the bracket B, the lever thus swinging in a plane parallel with the free edge of the hatch cover.

To support the hatch cover in partly open position for ventilating purposes, the lever A is disposed in raised position and latched to the hatch cover by means of the sliding latch E, the bolt or pin portion 47 of this latch being engaged through any selected set of openings 39—39 of the handle portion 29 of the lever A, as shown in Figure 6. The lever A being mounted for swinging movement toward and away from the free edge of the hatch cover by means of the pivotal connection of the lever supporting bracket B with the support F may, by inclining the same to the proper extent, be brought to the desired position to cooperate with the latch E on the hatch cover. In latching the hatch cover to the lever A, as shown in Figure 6, the latch E is first withdrawn so as to completely clear the opening between the ears 45—45 on the member C. This position of the latch is shown in Figure 5. The lever A is then moved against the hatch cover and registered with the ears 45—45 of the abutment member C in such a manner that the webs 38—38 of the handle section 29 of said lever embrace the outermost ear 45, with the selected set of aligned openings 39—39 of the webs in alignment with the openings of said ears. The lever A is then securely latched to the hatch cover by sliding the latch means E to locking position, thus engaging the bolt portion 47 thereof through the openings of both webs 38—38 of the lever A and the ear 45 embraced by these webs. Inasmuch as this bolt portion, in the latching position thereof, extends through both ears 45—45, it is effectively braced against bending strains.

I have herein shown and described what I now consider the preferred manner of carrying out my invention, but the same is merely illustrative and I contemplate all changes and modifications that come within the scope of the claims appended hereto.

I claim:

1. In a fastener for hatch covers of refrigerator cars, the combination with a hatch cover hinged along one edge thereof; of an abutment member on said cover at the free edge thereof opposite said hinged edge; a lever pivoted for swinging movement in a plane parallel to said free edge; means on said lever adjacent the pivot thereof engageable with said abutment member of the cover for forcing the latter tightly closed; a projection on said lever; and locking means fixedly mounted on the car adjacent the free edge of the cover and with respect to which said cover is swingable, said locking means including a member interlocking with said projection for locking the lever in position to hold the cover closed.

2. In a fastener for hatch covers of refrigerator cars, the combination with a hinged hatch cover; of an abutment member on said cover at the free edge thereof; a fixed support; a lever pivotally mounted on said support for swinging movement in a plane parallel to the axis of hinged movement of the cover and also in a plane at right angles to said first named plane; means on said lever engageable with the abutment of said cover for forcing the same open when swung in said first named plane; and cooperating latch means on said cover and lever for holding said cover in open position, said latch means being operatively positioned for locking the cover to the lever upon tilting said lever toward the free edge of the cover through swinging movement of said lever in said second named plane.

3. In a fastener for hatch covers of refrigerator cars, the combination with a hinged hatch cover; of a lever; a support at the free edge of said cover on which said lever is pivotally mounted for swinging movement in a plane parallel to the axis of hinged movement of the cover; means on said lever engageable with the cover for forcing the same open and closed during swinging movement of the lever in said plane; means for mounting said support for swinging movement about an axis parallel to the axis of hinged movement of the cover in direction laterally toward and away from the free edge of said cover; and latch means on said cover engageable with said lever when displaced toward said free edge of the cover for locking the cover to the lever to hold said cover partly open in ventilating position.

4. In a fastener for hatch covers of refrigerator cars, the combination with a hinged hatch cover;

of a support adjacent the free edge of the cover; a bracket; a pivot pin pivotally connecting said bracket to the support, said pivot pin being disposed parallel to the axis of swinging movement of the cover; a lever; a pin pivotally connecting the lever to said bracket to support said lever for swinging movement on said bracket in a plane parallel to the pivotal axis of said first named pin; means on said lever engageable with the cover by movement of said lever on its pivotal connection with said bracket for prying said cover open; and cooperating latch means on the lever and cover for latching the lever to said cover to hold the latter in partly open position, said latch means being brought into operative position when said lever is inclined toward said cover by swinging movement of the bracket on its pivotal connection with said support.

5. In a fastener for hatch covers of refrigerator cars, the combination with a hinged hatch cover; of an operating lever pivoted for swinging movement in a plane parallel to the axis of hinged movement of said cover, said lever being engageable with the cover when swung in said plane to force the same tightly closed; and means for locking said lever to hold the cover closed including a pair of spaced fixed perforated lugs on the car adjacent the free edge of the cover, a perforated fixed lug on the lever engageable between the lugs of said pair with the opening thereof aligned with the openings of said pair of lugs and a bolt engageable through said openings of all of said lugs.

6. In a fastener for hatch covers of refrigerator cars, the combination with a hatch cover hinged at its rear edge; of an operating lever; a bracket at the free front edge of the cover on which said lever is pivoted for swinging movement in a plane parallel to the axis of hinged movement of said cover; means for supporting said bracket for rocking movement toward and away from said free edge of the cover; an abutment member on the free edge of the cover having a projecting lug engageable by said lever when swung in said plane to force the cover tightly closed; an outstanding perforated ear on said abutment member; and a bolt slidably mounted on said abutment member and engageable through said lever and said ear when the lever is displaced toward said cover by rocking movement of said bracket for locking the cover to said lever to support the cover in partly open position.

7. In a fastener for hatch covers of refrigerator cars, the combination with a hatch cover hinged at its rear edge; of an operating lever; a bracket on which said lever is pivoted for swinging movement in a plane parallel to the axis of hinged movement of the cover; means for pivotally supporting said bracket for swinging movement toward and away from the front edge of the cover in a plane at right angles to said first named plane; stop means for limiting rocking movement of said bracket away from said free edge of the cover; means on said lever engageable with the cover by swinging movement of said lever in said first named plane for prying the same open; and means for latching the cover to the lever for holding said cover in partly open position, said latch means for the lever and cover being brought to operative latching position by swinging movement of said lever bodily with said bracket in said second named plane.

8. In a fastener for hatch covers of refrigerator cars, the combination with a hinged hatch cover; of a fixed support at the free edge of the cover; operating lever means comprising two members connected by a pivot, one of said members having an elongated operating handle portion; a pivot connecting the other of said members to said support, the pivotal axis of one of said pivots being parallel to the free edge of the cover to permit swinging movement of said handle portion toward said cover to be locked thereto and the pivotal axis of the other of said pivots being disposed in a direction transverse to said free edge to permit swinging movement of the handle portion parallel to the free edge of the cover; cooperating means on the handle portion and cover for locking the cover in partly open ventilating position; and projecting means on said cover engageable by said operating lever means to force the cover open when said handle portion of the lever is swung parallel to the free edge of the cover.

WILLIAM M. DWYER.